3,725,081
METHOD OF CHEMICAL TREATMENT OF CEREAL GRAINS TO MAKE THEM MORE RESPONSIVE TO VARIOUS GRAIN PROCESSES

Harold N. Barham, 3205 46th St., Lubbock, Tex. 79413, and Harold N. Barham, Jr., 511 W. 11th St., Plainview, Tex. 79072
No Drawing. Filed July 26, 1968, Ser. No. 754,138
Int. Cl. A23k 1/00
U.S. Cl. 99—2 R    11 Claims

ABSTRACT OF THE DISCLOSURE

A method for treating cereal grains to locate small molecules in depth, to promote desirable change in available kernel tissues, to make more effective enzymic, oxidative, reductive, hydrolytic, and other chemical changes for the purpose of rendering a major portion of the kernel more useful for various purposes, the method comprising contacting the grain with a gas under vacuum, such as sulfur dioxide or other gas, in the absence of substantial dehydration, to adsorb the gas ubiquitously by the internal structure of the grain, the gas being subjected to the grain at a rate greater than the rate of adsorption.

SUMMARY OF THE INVENTION

This invention relates to a basic method in which farinaceous products, particularly raw cereals, may be chemically treated in such a manner that the treated cereals may be sufficiently responsive to several different processes which presently do not exist, are not economically feasible, or may be performed more efficiently for the satisfaction of existing or potential uses.

A kernel of a cereal grain may be regarded as an entity with its substance bonded together so that its internal vector forces and organization are directional. Type, varietal, and environmental factors give a degree of individuality to various kernels such that entering molecules may have greater or lesser success in the extent to which they may pervade the kernel. Retaining the identity of the kernel permits much better control over and specificity in the changes in depth than do its separates. A molecule capable of passage into the tissue may result in its location at sites, in a readjustment of internal forces, in a chemical change, or in a multiple change; in a chemical change, the imbedded starch may or may not be affected.

The application of methods, both chemical and physical, to alter the various tissues of raw grain for virtually all cereal processes, has, of necessity, had to deal with the difficulties arising from the complicated structure of the cereal kernel. The grain kernel is so constructed that the starch granules of the endosperm are enveloped by a matrix consisting largely of protein and a relatively small amount of cellulosic material. Within the kernel there are avenues of molecular and greater than molecular dimension through or into which the molecules may move. Moreover, there are reaction sites which are sterically unavailable. Steric hindrance and inadequate forces of attraction make penetration of the kernel by other molecules, such as those of degradation chemicals, extremely difficult.

Processes hopefully designed to correct for undesirable characteristics inherent in the grains, together with those introduced on the way to the processor, are numerous. Liquid water is used frequently in one way or another. The conditions under which the soaking occurs vary widely; saturation is slow in any case. Usually the kernel swells nonuniformly due to bond interaction, with a net decrease in availability. Whether the structural changes are large or small, they will be related to the quality obtained in subsequent treatments.

Other process designed to decrease the kernel structure employ liquid water containing chemical substances called steepants. Steepants include reducing, oxidizing, hydrolytic, and swelling agents which are used for various and well established purposes. However, these methods vary in degree of success or suitability due to nonuniform swelling and various degrees of nonuniformity of chemical adsorption. Further, most of these processing methods are relatively expensive due to the costs of addition and removal of water, often used in copious quantities. One such process is the wet milling of cereal grains primarily for the purpose of producing starch. Since starch is essentially a pure polymeric fraction, its separation permits its use as such, or for subsequent modification. As indicated, the modification techniques are numerous, as are the array of the products derived therefrom.

The wet milling process is significantly more costly than dry milling for reasons which are self-evident and invites questions regarding the use of pure endosperm flours or whole grain flours for certain industrial uses. However, the functioning of the starch is severely restricted due to the protein matrix-chemicellulose-starch relationship, and, therefore, eliminates some potential markets presently served by starch.

Cereal processors' efforts toward processing grains for feeding livestock animals has probably been the most negelected category. Economics have placed very rigid parameters on the extent and cost of processing in that highly competitive endeavor. For the aforementioned reasons, the various tissues of the kernel are not readily available to the enzymatic systems of the various animals, particularly to the ruminant. Even so, until recently, efforts to ward that end have tended to be minimal, narrow, and frequently in parallel. Much of the processing has been simple grinding with minor variations of rolling, crimping, some steaming, and the like. Steam rolling of feed grains, notably corn, grain sorghum and barley, are now routine with the large cattle feeders. Without question, all of these efforts result in utilization which is improved over feeding whole grain. However, the results hardly meet with unanimity of acclaim and improved processing is a mandate for the near future; these methods are used primarily because of a lack of those which are either more efficient, less expensive to process, or both. More recently, efforts have led to the use of the kernel's own enzymic system to alter the kernel structure in such a manner as to make it more available to the animal's own digestive system. It is still not clear whether the results justify the costs.

If untreated whole grain with "as is" moisture is fed to a ruminant animal, less than ten percent of the weight of the grain is utilized because of the inaccessibility of the tissue to the digestive mechanisms of the animal's rumen. A method of treating grain to render a large portion of it utilizable by livestock animals, regardless of superimposed processing, if any, would be appropriate.

Typical of the many refining processes for treating or converting starch after it has been separated from other parts of the grain to convert it to commercially useful specialized products, are those disclosed in U.S. Pats. 2,698,818 and 2,698,936. By definition, these processes are applied to a "finely divided or powdered starch," and would not be suitable for the treatment of raw grain. In the process of the first patent, starch is converted into soluble starches, British gums, and dextrins and other modified starches or starch derivatives by first treating starch with a "dextrinizing chemical" under vacuum, while continuously dehydrating the mixture, followed by torrefying the material under vacuum at high temperatures and constant agitation. The dextrinizing chemical may be introduced as a gas, such as hydrogen chloride, and the entire process is performed with steady and continuous dehydration. The process of the second patent differs from that of the former in that in the first step the starch may, by use of appropriate agents, be modified by esterification, etherification, or condensation to form the corresponding product. Some of the required agents, such as hydrogen chloride, may be introduced in gaseous form to the material in a vacuum. Here again, the entire process is performed with continuous dehydration, the success of both processes being dependent upon dehydration of the product being treated, and consequent concentration of the reacting chemicals.

It is an object of this invention to provide a method for chemical treatment of cereal grains in such a manner that the treated grains will be sufficiently responsive to several different processes some of which do not exist at the present time.

It is a further object of this invention to treat the cereal grains so as to place chemicals throughout the ramifications of the kernel structure in a uniform manner. Such action significantly reduces the differences between and among cereal grains arising from differences due to hybrid, variety, environmental growth conditions, history (insect damage, moisture or heat damage, etc.) and type.

Another object of this invention is to provide a method for treating raw and untreated grain in such a manner that a significantly greater proportion of the kernel's nutrients will be made available to the fed animal.

Still another object of this invention is to provide methods for processing which are inherently simple and more economically feasible than any known to be in use up to this date.

The invention comprises placement of grain having at least five percent moisture into a container, hermetically sealing and evacuating the chamber, introducing at least one gas into the container at a rate greater than the rate of adsorption of the gas by the grain, termination of the flow of gas into the grain-bearing container, and maintaining the container in a sealed condition for a sufficient time to effect a substantial reduction in pressure caused by adsorption of the gas.

As used herein the term "grain" includes farinaceous materials in general and, more particularly, cereal grains including corn, grain sorghum, wheat, rice, barley, rye, oats, millet, triticale and other grains for which the term "cereal grains" is generic. The term "raw grain" means grain which has not been chemically or physically treated, and includes whole grain as well as grain which has been ground. It includes grain of a single variety or mixed varieties, hybrids, or types.

The term "adsorption" is used herein to mean the assimilation of gas throughout the ramifications of the kernel structure and includes simple adsorption of the gas or gases.

The process is particularly applicable to raw whole grain but is also applicable to parts of the whole grain formed by simple grinding or other means. The majority of the examples were performed on whole grain principally to illustrate the efficacy of the process for effecting adsorption of gas throughout the fine structure of the kernel, accessible by not other known means due to the highly integrated protein matrix-hemicellulose-starch complex. The process is applied to the raw grain including all of its unseparated components in contrast to starch treatment processes which are directed to starch per se, finely ground and already separated from other components of the grain into an essentially pure polymer.

The process is effective on grain of widely varying moisture content from "as is" up to 45 percent or more. Generally, the amount of adsorption of a particular gas, as well as the rate of adsorption, varies directly with the moisture content of the grain. Generally, and for most purposes, a moisture content of from 7 to 16 percent is necessary for practical operation of the process. For most purposes the process operates quite effectively at room temperature (25° C., ±5° C.). Generally, gas adsorption varies inversely with the prevailing grain temperature. It can be readily ascertained that by controlling both the moisture and temperature, the adsorption and reaction, if any, can be accurately controlled, a feature which is highly desirable, if not mandatory, for a process of such wide scope. In general, the higher the gas pressure in the vessel the greater the rate of adsorption by the grain, effect, all other conditions being at a steady state. Under certain moisture and temperature conditions, a strain may be placed upon the inter- and intra-tissue bonds which may be highly beneficial for some purposes. The process is conducted throughout with substantially no dehydration of the grain.

Practically any type of hermetically sealed chamber may be used in performing the process. For most gases best results are achieved by filling the chamber with grain to near capacity in order to assert more control. One purpose of the vacuum is to remove interfering air molecules; another purpose is to increase the molecular concentration of the gas or gases used thereby asserting additional control. A perfect vacuum, if possible, would be ideal; however, even a slight vacuum is operative. The objective of the process is readily achieved with an initial pressure of less than an inch of mercury. Gas may be admitted immediately after evacuation, but a stabilizing pause, for example, of 15 minutes, is preferred to ensure environmental equilibria. The value to which pressure rises when gas is admitted is preferably atmospheric; however, any pressure significantly higher than the initial vacuum can be used. The pressure need not reach atmospheric or it may be greater than atmospheric.

The rate of introduction of gas into the chamber is important and it must exceed that of adsorption by the grain in order to assure uniform distribution throughout the grain bed and throughout the kernal structure. The result is most easily attained by flashing the gas into the hermetically sealed and evacuated grain-bearing chamber until a predetermined pressure is attained in the chamber. A rising pressure indicates that the gas is being introduced at a rate exceeding the rate of adsorption which, in turn, ensures contacts of all particles or kernels by the gas for reasons which are self-evident. The rate of gas flow is controlled by standard techniques. The time of transfer of gas will vary with the gas used, grain used, amount of gas desired, and various other factors, some of which are set forth in the aforegoing discussion. It was determined that about 3.0 to 5.0 seconds were required to transfer one-half of one percent (based on the grain dry weight) of sulfur dioxide to the grain under the particular physical and environmental conditions which existed. After the gas was shut off, the main adsorption period followed. It has been determined that over half of the gas is adsorbed within the first 60 seconds for a typical situation using country-run grain sorghum. A period of two hours is recommended to ensure a high level of adsorption and subsequent chemical translocation, if any. However, the adsorption period is not always critical and a period of time as short as five minutes has been found to be satisfactory in some cases. Conversely, long adsorption times, due to week-end plant shut-downs, production equipment failure, and the like, have no deleterious effects whatever on the product. Under such circumstances the treated grain is extremely stable and, apparently undergoes no chemical reaction; or in those circumstances where some chemical reaction takes place, the reaction takes place over a short period of time and then becomes stable.

Ideally, the pressure drop during adsorption would ultimately approximate that originally imposed on the system; however, this condition is almost never reached. The pressure decreases rapidly and substantially after the gas supply is shut off due to adsorption of the gas. After the adsorption period a short stabilization period is preferable. Initial pressures between 0 and 173 millimeters of mercury have been used routinely and gasing termination pressures from 102 to 1,100 millimeters of mercury have been used. The total amount of gas adsorbed may be controlled by regulating the various parameters discussed above. For example, adsorption of sulfur dioxide can be limited to a small amount of gas by using a short gas flow time. Another method convenient for industrial application is control of the temperature of the gas/liquid source to regulate pressure. Still another method involves weighing or volumetric measurement of the gas prior to usage. Amounts of gas adsorbed can be consummated in accordance with, and to the extent of the desired economically feasible results. The amounts of gases which have been adsorbed range from 0.15 to five percent of the grain dry weight. For most purposes the amount of gas ranges from about 0.25 to 1.00 percent with 0.5 percent frequently used. For the whole grains used in the examples, sulfur dioxide was adsorbed in amounts varying from 0.5 to 0.787 percent based on the grain dry weight and actual weights. In Example 6 in which grain sorghum concomitant fraction (offal) was used, 2.25 percent of sulfur dioxide was used. At the 0.5 percent level frequently used, the excellent economic situation is readily apparent.

The gas used must be one which is compatible with the grain architecture and is capable of adsorption throughout all of the grain tissues. The gas, or gases, used are usually from a liquid-gas source for reasons of control over the rate of flow and availability. However, an all-gas source may function well. Also, chemicals, such as water, which are not gases at room temperature, may be used. It must be capable of serving a useful function, either converting the grain to a useful product by its presence, or through reaction products, or performing a useful chemical function, such as oxidation, reduction, hydrolysis, or some combination, upon subsequent treatment. It must be a gas capable of penetrating the protein and cellulosic components of the kernel structure under those conditions already stated, so as to gain access to all tissues of the complex kernel. Gases which are operative are: sulfur dioxide, hydrogen chloride, hydrogen sulfide, ammonia, chlorine, ethylene, and ethylene oxide. Gases may be used singly or in combination with other gases. Two gases, such as ammonia and carbon dioxide, which react in situ to form desirable compounds, may be used.

Other combinations of gases which have been used to form desirable compounds in situ are ammonia and hydrogen sulfide; ammonia and sulfur dioxide; sulfur dioxide, ammonia, and carbon dioxide; ammonia and chlorine; and ammonia and hydrogen chloride. One purpose in using two or more gases in this application is to introduce non-protein nitrogen into and throughout the grain. For example, in the in situ reaction of ammonia and carbon dioxide there are three probable products formed: ammonium carbonate, ammonium carbamate and urea. Other, and usually unlikely, compounds may be formed due to the very high polarity of the molecules involved and to the extreme steric restrictions throughout the grain berry. Also, $NH_4Cl$ may be derived from ammonia and hydrogen chloride, $(NH_4)_2SO_3$ from sulfur dioxide and ammonia, and so on. All such compounds are eventually hydrolyzed to ammonia in the digestive system of a ruminant animal and are available, eventually, for the animal to assimilate as protein.

The use of multiple gases illustrates the versatility of the process. For example, if the desired subsequent reaction initiated by steaming or otherwise, were reductive instead of reduction followed by hydrolysis as encountered with sulfur dioxide, then ammonium sulfite could be used by introducing ammonia and sulfur dioxide. A selection of gases may be made to obtain various results. Hydrogen sulfide may be adsorbed if there are reasons to employ the reduced form of sulfur instead of the oxidized form, that is, hydrogen sulfide. The reducing agents in both instances exhibit a bleaching effect on the whole grain. As is well known, it is difficult, if not impossible, to adsorb liquids uniformly into a kernel structure, so that the adsorption of a gas offers a feasible means for obtaining the end results desired.

As Example 5 shows, the use of an electrolyte prior to gas treatment has some advantages, but is optional. The effect of the electrolyte in enhancing adsorption of the gas, and subsequently the steam, appears to be more in the distribution of the adsorbed gas and steam than in the overall quality or rate of adsorption. The electrolyte, distributed and adsorbed by the grain in an aqueous solution, apparently blocks positions of easy access to cause the gas to be adsorbed by the fine structure of the kernel which is ordinarily slightly more difficult to reach. Another effect is to reduce somewhat the amount of gas required for a desired result. One commonly used electrolyte is sodium chloride in concentrated solution; however, alkali metal salts in general and other electrolytes are operable. Ammonium chloride, as well as sodium chloride, is inexpensive and in abundant supply; both are highly compatible with the grain and with animal dietary needs.

The product formed by the process, consisting of raw grain having adsorbed gas into internal structure, is highly stable and can be stored indefinitely prior to subsequent use or processing. Under proper conditions the product can be used to produce flours yielding a high proportion of available starch by use of conventional milling procedures, and is otherwise highly suitable for the manufacture of flour. For example, it was found that the kernels treated with sulfur dioxide by the process were significantly lighter and brighter than prior to treatment. Also, the endosperm, as seen from a cross-sectional portion (cut either way) usually appeared to be more uniform, and appeared to be significantly lighter. The treated grain may be adjusted to any moisture level suitable for conventional milling. The tissue fractionation is good, endosperm yield approximates the theoretical maximum, the flour produced is more attractive in appearance because of the lighter color and greater extent of particle subdivision, and the endosperm is very easily reduced and ground to a highly subdivided state. Evidence of the high degree of starch participation is the very high viscosity of the cooking paste produced from the products as compared to flour derived from untreated grain or cereal endosperm. Also, starch degradation does not result, and the flour exhibits an extremely long shelf life and the ability to paste. The foregoing is strong evidence that the starch granules themselves do not undergo degradation and, equally important, it is evident that the penetration and placement of the gaseous chemical is ubiquitous in extent.

One of the many uses for the gas treated product is illustrated by Examples 1 through 6 in which sulfur dioxide treated products were subjected to a steaming or cooking step to effect a general degradation to provide a product excellent for general feeding purposes. When finely ground the product may serve as an excellent binder, such as a feed pellet binder. In this step, superimposed on the gas adsorption step described, the treated grain was subjected to a vacuum in a hermetically sealed and preheated autoclave, and steam introduced into the environment of reduced pressure so as to achieve a relatively high pressure in a short time, preferably within one minute. The purpose of this step is to react the adsorbed chemical in the fine structure of the cereal kernel with that fine structure, including the starch content, to provide a product high in hot and cold water solubility but embodying relatively few reducing groups.

The cooking (steaming) process is unique in that an increased moisture content is unnecessary; "as is" moisture can be used. As the temperature in the autoclave is increased, due to the increasing steam pressure, the grain adsorbs a good deal of the gaseous water from the imposed atmosphere, but most of this water is desorbed as the steam is released to atmosphere. Thus, the discharged grain contains a moisture content the same, or slightly greater, than the original, eliminating the usual and significant expense of dehydration, an important advantage over current practices, which is quite apparent. The steaming step is peculiarly adapted for use on a cereal grain having a chemical uniformly adsorbed within and throughout the general structure of the kernel. Pressures ranging from 25 to 250 p.s.i.g. have been used, but generally pressures much below 150 p.s.i.g. are not satisfactory if the desired degree of degradation is high; lower pressures may be useful, depending upon the desired end product. Pressures greater than 250 p.s.i.g. may be used if it is desirable to reduce the time at that peak pressure to a value approaching zero time. All of the Examples 1 through 6 were carried out at pressures of 150 or 250 p.s.i.g., both of which are considerably higher than those known to be used in industry; such is the preferred pressure range. The total time under steam pressure varies according to the peak pressure and to the degree of degradation desired. In general, the higher the peak pressure the shorter the time requirement at that pressure, all other criteria being the same.

Examples which follow illustrate but do not limit the invention. In the examples, and elsewhere in the specification, all percentages are based on weight. Percent of moisture is based on total weight of the grain and the percent gas is based on the grain dry weight. The weight of the gas adsorbed in all examples was determined by actual weight differential, before and after gas exposure. Evacuation was to a very low pressure by a mechanical vacuum pump. A glass evacuation chamber was used; corrosion problems, if any, were eliminated and the samples could be observed. In all examples, just prior to the instant that gas was flashed into the chamber, the pressure was lower than at any other time after the gas was introduced.

The gas was flashed into the evacuated chamber from a liquid-gas source in most of the following examples. In those examples where gas was introduced in two or more operations, the second or third exposure was necessary only because a sufficient quantity was not introduced in the first operation. Such procedure illustrates the flexibility of this portion of the invention. Even though most of the gas is adsorbed immediately after its introduction into the chamber, quite long adsorption periods were used to obtain maximum adsorption of the gas. Accordingly, adsorption time can vary widely, very favorable results having been obtained with the use of only five minutes adsorption time. Reducing sugar values, a measure only of reducing groups, are expressed on the basis of glucose. In all examples raw grain was used. The term "releasing the vacuum" simply means permitting air to return to the reacting chamber when gas adsorption time was terminated.

Where steam treatment is used, the autoclave was, in all cases, preheated to a temperature greater than that which would be attained with the anticipated peak pressure to prevent condensation. In all cases the steam was flashed into the evacuated autoclave. The process is also operative if a vacuum is not used, but is more effective when interfering atmosphere molecules have been removed.

EXAMPLE 1

Whole grain sorghum, 149.3 grams with 10.7% moisture, was mixed with 5.7 grams of water to increase the moisture content to about 14%. The tempered grain was then placed in the reaction chamber, hermetically sealed, and subjected to a vacuum (less than one inch of absolute pressure). After equilibrium conditions were established, 0.625 gram of sulfur dioxide (0.5%) was flashed into the nearly filled chamber increasing the chamber pressure to atmospheric (ca. 14.7 p.s.i.a., or 29.92 inches of Hg), requiring 4.0 seconds, after which the flow of gas was stopped. The pressure started to drop immediately, regaining 77% of the original vacuum within one minute and 91% of said vacuum within 5 minutes and approximating the original vacuum (within one inch) at the end of an hour. The grain color became lighter as the gas was added. The grain remained in the hermetically sealed chamber for a total of 9.75 hours after the chemical addition, all at the prevailing 24° C. room temperature, then the vacuum was released and the sample transferred to the preheated autoclave. The autoclave was hermetically sealed and a vacuum established (ca. 22 inches of Hg), followed by the injection of steam at such a rate that the peak pressure of 250 p.s.i.g. was attained within 2.5 minutes. Such a pressure was maintained for an additional one minute, and then the steam was exhausted to atmosphere in 1.17 minutes. The discharged grain moisture content was 17.0%. After air drying (75° C.) to about 6% moisture, the grain was easily and finely ground by a hammer mill. The resulting whole grain product had a reducing sugar content of 1.93%, cold water solubles of 80.40%, and hot water solubles content of 83.49%, all based on the final 5.74% moisture basis.

EXAMPLE 2

155.0 grams of whole grain dent corn with an adjusted moisture content of 14% was used. 0.55 gram of sulfur dioxide (0.4125%) was flashed into the grain-bearing chamber for 5.7 seconds and the flow of gas terminated. The pressure, atmospheric at the instant the gas was shut off, decreased rapidly and the grain color became lighter and brighter. Within one minute, 70% of the original vacuum was recovered and 97% was recovered within the first hour. After 11.75 hours the vacuum was released and the grain transferred to the preheated autoclave which was hermetically sealed and a vacuum of about 26 inches Hg was imposed thereon followed by the introduction of steam at a rate such that the peak pressure of 250 p.s.i.g. was attained in 1.25 minutes, this peak pressure being maintained for an additional two minutes. The steam was discharged to atmosphere within 45 seconds leaving the grain sample slightly sticky but generally free flowing which was removed from the autoclave. The moisture content was reduced from 9.5% to 5.5% by air drying (75° C.), cooled, and finely ground with ease in a hammer mill. The resultant product had a reducing sugar level of 3.45% and cold and hot water solubles content of 81.03 and 84.10%, respectively, based on the final 5.37% moisture content.

EXAMPLE 3

155.0 grams of dehulled whole rice grain having a moisture content adjusted to 14% was used and 0.5 gram of sulfur dioxide was flashed into the chamber, increasing the pressure to atmospheric in a period of 3.0 seconds, and the flow of gas terminated. The pressure started to decrease immediately and the grain was lightened somewhat in color. After one minute the pressure decreased to 71% of the original vacuum and at the end of one hour had decreased to 97% of the original vacuum. After 1.8 hours with the vacuum being 98% of that originally established, sulfur dioxide was introduced into the chamber again, this time for 1.8 seconds, increasing the pressure from vacuum to 12.3 p.s.i.a., and the flow of gas terminated. During the second addition 0.3 gram of $SO_2$ was introduced into the chamber making a total of 0.8 gram (0.6%) of gas. No color change occurred during the second addition of sulfur dioxide. Within one minute after the cessation of the second addition, 74% of the original vacuum was restored, and 97% was reestablished after one hour. The vacuum was released at the end of 12.4 hours and the treated grain transferred to the preheated autoclave which was hermetically sealed and a vacuum of about 26 inches Hg. drawn in the autoclave.

Steam was fed into the autoclave at such a rate that a peak pressure of 150 p.s.i.g. was attained in one minute and this peak pressure was held for an additional four minutes after which the steam was released to atmosphere at about the same rate it was introduced. The discharged sample had a moisture content of about 14% which was reduced by air (75° C.) drying to about 5.0% and then easily ground finely with a hammer mill. The resulting product had a reducing sugar value of 1.13% and cold and hot water solubles content of 85.15% and 90.86%, respectively, based on the final 4.83% moisture content.

EXAMPLE 4

In this example 155.0 grams of whole grain triticale having an adjusted moisture content of 14% was used. 0.6 gram of sulfur dioxide was flashed into the grain-bearing chamber in 3.8 seconds, increasing the pressure to atmospheric, after which the flow of gas was terminated. The color of the kernels of grain lightened immediately in color. The rate of adsorption was about that described for previous examples. Upon release of the vacuum after 1.8 hours, 99% of the original vacuum was attained, and sulfur dioxide was again introduced into the chamber, this time for 2.7 seconds, increasing the pressure from vacuum to atmospheric, and the flow of gas was terminated. During the second addition of sulfur dioxide, 0.45 gram of gas was introduced making a total of 1.05 grams (0.787%). Within one minute after the cessation of the second addition of gas, 56% of the original vacuum was restored and 95% was restored after one hour. At the end of 11.25 hours, the vacuum was released and the sample transferred to the preheated autoclave. After sealing, a vacuum of about 26 inches Hg was drawn in the autoclave and steam was introduced at such a rate that a peak pressure of 150 p.s.i.g. was attained within 1.2 minutes and that peak pressure maintained for an additional four minutes, after which the steam was exhausted to atmosphere. The discharged grain exhibited the usual medium tan color, was uniform, free flowing and had a moisture content of about 17.7%. After drying to approximately 5.25% moisture (75° C. air), the grain was finely ground through a hammer mill. The resultant product had a reducing sugar value of 2.53% and cold and hot water solubles content of 75.29 and 82.55%, respectively, all based on the final moisture content of 5.18%.

EXAMPLE 5

149.3 grams of whole grain sorghum having a moisture content of 10.7% was mixed with 9.05 grams o sodium chloride solution which contained 2.667 grams of sodium chloride (2.00%) and 8.08 grams of water and which increased the moisture content to about 15.3%. After tempering in the sodium chloride solution, the grain was placed in the reaction chamber which was hermetically sealed and evacuated. 0.6 gram of preweighed sulfur dioxide (0.45%) was flashed into the chamber, increasing the pressure from vacuum to about 14 inches of Hg and requiring 4.6 seconds. The grain lightened in color immediately and the sulfur dioxide was adsorbed rapidly, 90% of the original vacuum being attained within five minutes and 98% of the original vacuum being attained within one hour. The vacuum was released after some 40 hours of conditioning and the sample transferred to a preheated autoclave which was hermetically sealed and evacuated to about 26 inches of Hg. Steam was introduced into the autoclave at a rate such that a peak pressure of 150 p.s.i.g. was attained in 60 seconds, this peak pressure being maintained for an additional four minutes. Upon release of the steam to the atmosphere, the discharged converted grain had a moisture content of 17.6%, was free flowing and relatively dark in color. After drying to about 7.5% moisture the grain was finely ground with a hammer mill. The converted product had a moisture content of 7.47%, a reducing sugar value of 2.35%, and cold and hot water solubles of 76.81% and 84.18%, respectively, based on the moisture content of the ground product.

EXAMPLE 6

151.4 grams of grain sorghum offal containing 11.93% moisture was used. The sample was a byproduct from the production of grain sorghum brewers' grits and contained all the fractions of the berry not included in the grits, which were essentially small and coherent portions of low-fat endosperm. The moisture content of the offal fraction was adjusted to 14%, and after complete moisture adsorption, the unground and highly cellulosic material was placed in the glass reaction chamber, hermetically sealed, and evacuated. 3.0 grams of sulfur dioxide (2.25%) was flashed into the chamber in a period of 9.9 seconds with the pressure increasing to about 8.4 p.s.i.a. (17 inches of Hg), and the flow of gas terminated. The general hue of the color of the cereal tissue was lightened nearly instantaneously and the rate of adsorption was extremely rapid. Within an hour after gas injection, 86% of the original vacuum was restored, due to adsorption, and 90% of the vacuum was reestablished after 15.25 hours at which time the vacuum was released. The sample was transferred to a preheated autoclave which was sealed and evacuated to about 26 inches of Hg. Steam was then introduced into the autoclave at a rate such as to attain a peak pressure of 150 p.s.i.g. after 75 seconds, this peak pressure being maintained for four additional minutes, at which time the steam was released to atmosphere at about the same rate it was introduced. The resulting product contained 16.8% moisture, was free flowing, slightly lumpy, easily handled and uniformly converted. The sample was dried to about 4.0% moisture, cooled, and finely ground through a hammer mill. The final product exhibiting a reducing sugar value of 4.00% and cold and hot water solubles content of 60.23% and 68.54%, respectively, all based on the final moisture content of 3.75%.

EXAMPLE 7

151.5 grams of grain sorghum offal having a moisture content of 12% was used. 2.60 grams (1.95%) of ammonia was flashed into the reaction chamber over a period of 17.0 seconds, at which time the pressure was 686 mm. Hg. At the end of one hour, the pressure in the reaction chamber had been reduced to 160 mm. Hg due to the adsorption of ammonia, and at the end of three hours it had been reduced to 130 mm. Hg.

EXAMPLE 8

151.5 grams of whole grain sorghum having a moisture content of 12% was used. 0.20 gram of hydrogen sulfide (0.15%) was flashed into the evacuated chamber over a period of 5.5 seconds, at which time the pressure had reached 686 mm. Hg. The gas was shut off and the pressure in the chamber was reduced to 546 mm. Hg in one hour and 455 mm. Hg at the end of 11.8 hours.

EXAMPLE 9

168.8 grams of whole grain sorghum having a moisture content of 21% was used. 1.10 grams of HCl gas (0.825%) was flashed into the evacuated chamber in a period of 5.2 seconds, at which time the pressure in the chamber had increased to 686 mm. Hg. The gas was shut off and the pressure in the chamber was reduced to 74 mm. Hg at the end of one hour and this pressure remained at the end of 2.8 hours, indicating that practically all of the 1.10 grams of hydrogen chloride had been adsorbed.

EXAMPLE 10

151.5 grams of whole grain sorghum containing 12% moisture was used. 0.40 gram (0.30%) of ethylene was flashed into the evacuated chamber over a period of 6.6 seconds, at which time the pressure in the chamber had increased to 686 mm. Hg. The gas was shut off and the pressure in the chamber, due to the adsorption of ethylene oxide, reached a value of 335 mm. Hg at the end of 30 seconds and 330 mm. Hg at the end of 12.6 hours.

EXAMPLE 11

168.8 grams of whole grain sorghum adjusted to 21% moisture was used. 0.2 gram of chlorine gas (0.15%) was flashed into the evacuated container in 7.4 seconds, at which time the pressure in the evacuated container reached atmospheric. The grain was left in the chamber until the pressure became stabilized slightly above the original pressure.

EXAMPLE 12

168.8 grams of whole grain sorghum having a moisture content of 21% was used. 1.40 grams of ammonia (1.050%) was flashed into the container in 11.1 seconds at which time the pressure had reached atmospheric pressure. The gas was shut off and at the end of one hour 98% of the original vacuum had been restored. After 11.6 hours 1.80 grams of carbon dioxide (1.35%) was flashed into the container in three different exposures, one hour apart, and over a total period of 18.9 seconds. At the end of each of the three exposures the pressure attained was atmospheric. At the end of one hour after the third exposure 79% of the original vacuum had been restored and 93% restored 14 hours after the final $CO_2$ exposure.

EXAMPLE 13

227.8 grams of whole grain sorghum having an adjusted moisture content of 21% was used. Sulfur dioxide, ammonia and carbon dioxide were flashed into the evacuated container in that order, all at 42° C. 0.90 gram of sulfur dioxide (0.5%) was flashed into the container over a period of 8.4 seconds at which time the pressure inside the container had reached 14 inches Hg. The gas was then shut off and 91% of the original vacuum had been recovered at the end of one hour and remained about the same to the end of the 3.8 hour adsorption time period. At the end of this time 1.50 grams of ammonia (0.833%) was introduced into the container over a time increment of 4.6 seconds at which time the pressure in the container was about equal to atmospheric. At the end of one hour more than 98% of the original vacuum had been recovered in the container and after 2.8 hours nearly 100% of the original vacuum was restored. Carbon dioxide was then introduced into the container in three different 30-second exposures over a time period of 26.5 hours, each time increasing the pressure to atmospheric. A total of 1.30 grams of carbon dioxide (0.722%) was adsorbed by the grain. Nearly 96% of the original vacuum had been restored 10.3 hours after the third and final $CO_2$ exposure.

EXAMPLE 14

162.6 grams of whole grain sorghum having an adjusted moisture content of 18% was used in this example in which ammonia was first introduced into the grain followed by the introduction of hydrogen sulfide. 1.40 grams of ammonia (1.05%) was introduced into the evacuated chamber over a period of 10.0 seconds at which time the pressure had reached 686 mm. Hg. The gas was shut off and the pressure decreased to 33 mm. Hg at the end of one hour and 13 mm. Hg after 4.8 hours. At this time 0.70 gram of hydrogen sulfide (0.525%) was introduced into the chamber over a period of 5.0 seconds at which time the pressure in the chamber had again reached 686 mm. Hg. At the end of the first hour after $H_2S$ initial exposure the pressure had decreased to 76 mm. Hg and at the end of 15.5 hours it had dropped to 48 mm. Hg.

EXAMPLE 15

In this example, in which ammonia was used first, then followed by the adsorption of hydrogen chloride, 162.6 grams of whole grain sorghum having an adjusted moisture content of 18% was used. 1.40 grams of ammonia (1.050%) was introduced into the evacuated chamber over a period of 8.2 seconds, at which time the pressure had reached a value of 686 mm. Hg. The gas was shut off and at the end of one hour the pressure had decreased to 43 mm. Hg and after five hours the pressure had decreased to 25 mm. Hg. At the end of the five-hour adsorption time period, 1.80 grams of hydrogen chloride (1.350%) was flashed into the grain-bearing container over a period of 4.6 seconds, at which time the pressure in the container had reached 686 mm. Hg; after one hour the pressure had decreased to 76 mm. Hg and to 50 mm. Hg at the end of the 15.7 hour adsorption time increment.

EXAMPLE 16

In this example in which ammonia was adsorbed by the grain first, followed by adsorption of ethylene oxide, 162.6 grams of whole grain sorghum having an adjusted moisture content of 18% was used. 1.50 grams of ammonia (1.125%) was introduced into the evacuated chamber over a period of 13.0 seconds at which time the pressure in the container reached 686 mm. Hg. At the end of one hour the pressure had reached 45 mm. Hg and after 4.7 hours had decreased to 36 mm. Hg. At the end of this time 0.80 gram of ethylene oxide (0.6%) was introduced into the chamber over a period of 7.7 seconds, at the end of which time the pressure had reached 686 mm. Hg. The gas was shut off and one hour later the pressure had decreased to 229 mm. Hg and at the end of 15.3 hours had dropped to 152 mm. Hg.

EXAMPLE 17

In this example, in which ammonia was introduced into the grain bed, followed by exposure to chlorine, 151.5 grams of whole grain sorghum having a moisture content of 12% was used. 0.5 gram of ammonia (0.375%) was introduced into the evacuated chamber over a period of 7.5 seconds at which time the pressure in the chamber had reached 686 mm. Hg. The gas was shut off and the pressure in the container allowed to stabilize at a pressure slightly above the original vacuum. Four hours after the $NH_3$ introduction 0.9 gram of chlorine (0.675%) was introduced into the chamber over a period of 6.25 seconds at which time the pressure had reached about 686 mm. Hg. The gas was shut off and the pressure allowed to stabilize at a pressure moderately above the original vacuum. The amount and rate of adsorption was good to excellent and the grain became darkened.

In a reversal of the procedure described in Example 17, in which the chlorine gas was introduced before the ammonia, substantially the same results were obtained.

EXAMPLE 18

Whole grain sorghum, 209.3 grams with 14% moisture, was used. 1.00 gram of hydrogen chloride (0.556%) was flashed into the evacuated grain-bearing chamber in 2.0 seconds. After termination of gas flow, the pressure started to decrease instantly and rapidly. No significant color change was noted. Within 30 seconds, over 87% of the original vacuum had been recovered and 89% of that vacuum was restored 15 minutes after termination of gas flow. The pressure remained essentially the same for the duration of the 20 hours allotted for total gas adsorption. At the end of the adsorption time the vacuum was released and the sample transferred to the preheated autoclave which was sealed hermetically and a vacuum of 25 inches Hg was drawn. Steam was then injected at such a rate that the peak pressure of 150 p.s.i.g. was attained in about one minute, and this pressure was maintained for four additional minutes, after which the steam was exhausted at atmosphere at about the same rate it was introduced. The discharged grain was dark colored, uniform, free-flowing, and had a "sweet" odor. The converted grain was then air dried (75° C.) from about 19% to nearly 4% moisture. The grain was easily ground through a hammer mill. The resulting adhesive product was cold water soluble to the extent of 66.38%, based on the final moisture content of 3.59%.

EXAMPLE 19

209.3 grams of whole grain sorghum having an adjusted moisture content of 14% was used. Sulfur dioxide and ammonia were flashed into the evacuated grain-bearing chamber in that order, all at room temperature. 0.9 gram of sulfur dioxide was flashed into the container over a period of 24.4 seconds at the end of which time the pressure began to decrease instantly, 43% of the original vacuum being restored within one minute, 93% after one hour, and 98% re-established at the end of the 11.3 hour adsorption period. 0.4 gram of ammonia was flashed into the evacuated chamber in 3.7 seconds, increasing the pressure to atmospheric. Seven minutes after the gas was shut off, 99% of the vacuum had been recovered and at the end of that short adsorption time ammonia was flashed into the container again, this time for 6.0 seconds delivering 0.42 gram (a total of 0.455%) of ammonia. 81% of the starting vacuum had been recovered within one minute and 102% of that vacuum at the end of the 2.8 hour adsorption period. The final vacuum was 99.5% of the original vacuum, prior to the introduction of sulfur dioxide. At the end of the 2.8 hour adsorption period, after the second ammonia exposure, the vacuum was released, and the sample was transferred to the preheated autoclave. Immediately after transfer the autoclave was evacuated and steam directed into the autoclave at such a rate that the peak pressure of 150 p.s.i.g. was reached in 1.25 minutes; this pressure was maintained for an additional four minutes. The steam was then exhausted to atmosphere at about the same rate it was introduced. The discharged sample was relatively light in color, free-flowing, and uniform. The moisture was reduced from 16.9 to about 4.00% by air drying at 75° C. The converted grain was easily ground in a hammer mill. The resulting product was 55.95% soluble in cold water, based on the final 3.49% moisture.

EXAMPLE 20

209.3 grams of whole grain sorghum, containing an adjusted moisture content of 14% was used. Sulfur dioxide, ammonia, and hydrogen chloride were used, in that order, all at room temperature. 0.9 gram of sulfur dioxide (0.5%) was flashed into the evacuated and hermetically sealed container in 23.8 seconds, increasing the pressure to atmospheric, then the supply of gas was shut off. The pressure started to drop instantly, reaching 49% of the original vacuum within 60 seconds, and 93% of the original vacuum within an hour. At the end of the 14.1 hour adsorption time 98% of the vacuum had been restored. 0.68 gram of ammonia (0.378%) was flashed into the evacuated chamber, increasing the pressure to atmospheric after 22.1 seconds, at which time the gas flow was terminated. The pressure commenced to decrease instantly, recovering 92% of the starting vacuum after 10 minutes at which time the sample was subjected to another ammonia exposure, this time 0.30 gram being added in 9.2 seconds. A total of 0.98 gram of ammonia was adsorbed (0.544% total). The pressure started to drop simultaneous with gas flow cessation, 82% of the starting vacuum being re-established within one minute and 99.6% of the starting vacuum within 15 minutes. The grain adsorption period was 28.8 hours, and at the end of this time 1.0 gram of hydrogen chloride was flashed into the evacuated chamber in 9.8 seconds; then the gas flow shut off. The vacuum was 85% recovered after 15 minutes at which time the second exposure to hydrogen chloride was made. 0.55 gram of hydrogen chloride was flashed into the container in 9.8 seconds (1.55 grams, or 0.861% in all). Again, at the instant the gas supply was shut off the pressure began to drop. After 18.1 hours adsorption time the starting vacuum was 70% recovered after which time the vacuum was released and the grain was transferred to the preheated autoclave. Immediately, the pressure was reduced to about 26 inches Hg of vacuum, and then steam was introduced at such a rate that the peak pressure of 150 p.s.i.g. was attained within 1.17 minutes. The 150 p.s.i.g. pressure was maintained for four minutes and then exhausted to atmosphere at about the same rate it was introduced. The converted grain was free-flowing and very dark in color. At 75° C. the sample was air dried from 16.7% to 4.0% moisture. The resulting product, easily ground through a hammer mill, was 59.46% cold water soluble, based on the final 3.28% moisture content.

EXAMPLE 21

209.3 grams of grain sorghum, containing an adjusted moisture content of 14% was used. Both sulfur dioxide and hydrogen chloride, in that order, were used. The grain was placed in a container, hermetically sealed, and evacuated. After equilibrium conditions were established, 0.89 gram of sulfur dioxide (0.49%) were flashed into the container in 24.1 seconds, after which the flow of gas was stopped. The pressure started to decrease immediately and rapidly so that within one minute 53% of the vacuum had been restored and 96% of the vacuum had been recovered by the end of the 19.1 hours adsorption time. Hydrogen chloride was flashed into the evacuated chamber (0.61 gram, or 0.33%) for 4.6 seconds, and then the gas flow stopped. The following adsorption was very rapid with 87% of the starting vacuum recovered in 60 seconds and 94% recovered within one hour. After an 18.3 hour adsorption time, and with the vacuum 94% of that just prior to the hydrogen chloride exposure, the vacuum was released. The grain was transferred to the preheated autoclave, the autoclave evacuated to about 25 inches Hg, steam was introduced into the autoclave at a rate such that the peak pressure of 150 p.s.i.g. was attained within 1.33 minutes and that pressure maintained for an additional four minutes. The steam was then exhausted to atmosphere at about the same rate it was introduced, and the grain removed. The discharged sample was free-flowing, relatively dark in color and uniform. After drying from about 13% to about 4% moisture by air at 75° C., the sample was cooled, and easily ground through a hammer mill. The adhesive product was 78.40% soluble in cold water, based on the final 3.70% moisture.

It should be emphasized that a gas in no case is introduced into an evacuated system to provide a surface protection for the substance under treatment. On the contrary, the object of the process will be realized only when such chemicals penetrate uniformly and in depth in order to react uniformly or to be readily available for subsequent reaction. As a case in point, when sulfur dioxide is adsorbed and the intermediate product is subjected to the steaming step, reduction reactions occur followed by, and simultaneously with, the formaiton of sulfuric acid which is hydrolytic in function. Similarly, when hydrogen chloride is incorporated into the grain, hydrochloric acid serves as the hydrolytic agent during the steaming process. The adsorption of any of the compatible gases may be used in conjunction with the superimposed steaming procedure.

Apparently, there is some pyrolysis which takes place simultaneously with other degradation reactions. For instance, in one experiment in which no chemicals were used, the steaming process was carried out with grain sorghum (14 percent moisture) at 15 p.s.i.g. for four minutes. The product had a cold water solubles content of 47.54 percent. In another experiment, involving identical grain, the steaming treatment was carried out at 250 p.s.i.g. for 1.5 minutes with the resulting product having a cold water solubles content of 65.20 percent.

The product formed from the cooking or steaming step of Examples 1 through 5 and 18 through 21 was a whole grain product, none of the grain components having been separated throughout the process; thus, there are no byproducts such as those associated with the various commercial processes involving the separation of tissues. The utility of such products lies in the improved response in their utilization.

As shown in Examples 1 through 5, the product formed from steaming a sulfur dioxide-treated grain had a cold water solubles content ranging from 75.29% to 85.15% and hot water solubles ranging from 82.55% to 90.86%. The reducing sugar values ranged from 1.13% to 3.45%. The product formed during the process described in Example 6, involving grain sorghum offal, exhibited cold and hot water solubles of 60.23% and 68.54%, respectively, considerably higher figures than can be accounted for than by the starch content alone.

Typical products from the steaming step were dried to a practical level and samples placed in the rumen of a fistulated steer, using the nylon bag technique. Unlike ordinary whole untreated kernels, wherein a typical one to ten percent disappearance was noted in 24 hours, 95.8 percent disappearance was recorded in one instance. With other samples and varying conditions, results have been excellent with all products tested exhibiting a disappearance of greater than 60 percent in 24 hours. None of the kernels of grain were ground. The product resulting from the steaming process was found to be useful as a nutritive pellet binder, as a replacement for molasses used as a carrier in liquid feed supplements, in the manufacture of gypsum wall board and strongly suggest its use for other purposes where such products in the trades are used.

The products formed by treating grain sorghums first with ammonia and then carbon dioxide (Example 12), and with sulfur dioxide, ammonia and carbon dioxide (Example 13) were tested in a fistulated steer by the nylon bag technique. Both treated grains were significantly improved over the control. Another object of the process was to provide a product with non-protein nitrogen to increase the equivalent protein content, a common ruminant feeding practice. When added separately to a mixed feed the inorganic nitrogenous compound (typically urea) readily dissolves in the fluids of the rumen causing its availability to be out of phase with the much slower rate of digestion and assimilation of organic materials. Furthermore, when such compounds are added to feeding materials it is difficult to add these small quantities uniformly and even more difficult to prevent gravity separation during the subsequent handling. Relatively large doses of urea may result in "urea poisoning" with the resultant death of the animal; such occurrences are not rare. When placed throughout the fine structure of the cereal kernel, the inorganic additives are available at rates approximating those of enzyme conversions of organic substances. The sulfur dioxide placed in the grain does provide sulfur, necessary for the synthesis of certain essential amino acids by the animal, but is used primarily to reduce the protein matrix to cause the structure to become more available for enzyme attack. Also, the sulfur dioxide or sulfur trioxide combines with the ammonia.

The invention provides many improvements over the prior art. It provides a fast, economical method for adsorbing the gases into the kernel structure of raw grains to produce improved grain products and to prepare the grain for further processing. It provides a product which upon hydrolysis yields a nutritious food product and a feed pellet binder. Also provided is a low-cost method for producing degraded products from grain which have previously been unavailable from an economic standpoint. The equipment involved is extremely simple requiring a minimum of electrical and/or mechanical power, very short time intervals for processing, and, in most cases, relatively small amounts of inexpensive chemicals. The method makes secondary, or superimposed processes practical which heretofore have been impractical, uneconomical, or nonexistant, and it improves upon such processes already in use.

It is to be understood that this invention is not limited to the exact embodiments of the methods and various apparatus shown and described, which are merely by way of illustration and not limitation, as various other forms and modifications will be apparent to those skilled in the art, and it is, therefore, intended that the appended claims cover all such changes and modifications.

What is claimed is:

1. A method for treating raw whole cereal grain to render the internal structures thereof more available for use comprising the steps of:
    (a) placing the raw whole cereal grain in a pressure vessel;
    (b) evacuating the pressure vessel to a first pressure below atmospheric; and
    (c) introducing into the pressure vessel at least one gas selected from the group consisting of sulfur dioxide, hydrogen chloride, hydrogen sulfide, ammonia, chlorine, and mixtures thereof at a pressure above said first pressure until a selected pressure in the vessel is attained to adsorb the gas into the kernel structure of the grain.

2. The method of claim 1 in which the rate of introduction of gas into the pressure vessel is adjusted to maintain the pressure therein constant or increasing.

3. The method of claim 1 in which introduction of said gas is continued until the pressure in said pressure vessel reaches about atmospheric.

4. The method of claim 1 in which said pressure vessel is sealed when the pressure in its interior reaches said selected pressure and maintained in a sealed condition until its interior pressure decreases at least halfway to said first pressure.

5. The method of claim 1 in which the gas introduced is at a temperature above the boiling point under ambient conditions of the chemical from which the gas evolves.

6. The method of claim 1 in which the gas is sulfur dioxide.

7. The method of claim 1 in which the gas is hydrogen chloride.

8. The method of claim 1 in which the gas is hydrogen sulfide.

9. The method of claim 1 in which the gas is ammonia.

10. The method of claim 1 in which the gas is chlorine.

11. The method of claim 1 in which the container is evacuated to a pressure between about 0–173 mm. of mercury, the amount of gas introduced varies from about 0.15–5 percent of grain dry weight and the pressure is increased to a maximum of about 1,100 mm. of mercury.

References Cited
UNITED STATES PATENTS

| | | | |
|---|---|---|---|
| 2,080,179 | 5/1937 | Merriam et al. | 99—225 |
| 2,189,947 | 2/1940 | Griffith et al. | 99—225 |
| 2,237,739 | 4/1941 | Jones | 99—216 |
| 2,653,104 | 9/1953 | Carman | 99—82 |
| 3,046,142 | 7/1962 | Gaver et al. | 99—225 |
| 3,206,275 | 9/1965 | Sair et al. | 99—225 |
| 3,259,501 | 7/1966 | Ulrey | 99—8 |
| 3,531,293 | 9/1970 | Boehme | 99—2 |

FOREIGN PATENTS

| | | | |
|---|---|---|---|
| 24,912 | 10/1914 | Great Britain | 99—2 |

WILBUR L. BASCOMB, Jr., Primary Examiner

C. P. RIBANDO, Assistant Examiner

U.S. Cl. X.R.

99—80 PS, 225, 227